United States Patent
Lentz et al.

(10) Patent No.: US 9,745,077 B1
(45) Date of Patent: Aug. 29, 2017

(54) SYSTEMS AND METHODS FOR DISPLAYING NOTIFICATIONS ISSUED ON BOARD AIRCRAFTS

(71) Applicants: Robert L. Lentz, Severna Park, MD (US); Fraser R. Chisholm, Lantau Island (HK)

(72) Inventors: Robert L. Lentz, Severna Park, MD (US); Fraser R. Chisholm, Lantau Island (HK)

(73) Assignee: Rockwell Collins, Inc., Cedar Rapids, IA (US)

( * ) Notice: Subject to any disclaimer, the term of this patent is extended or adjusted under 35 U.S.C. 154(b) by 24 days.

(21) Appl. No.: 14/529,349

(22) Filed: Oct. 31, 2014

(51) Int. Cl.
| | |
|---|---|
| *G08B 23/00* | (2006.01) |
| *B64D 45/00* | (2006.01) |
| *G06F 3/0484* | (2013.01) |
| *G06F 3/0482* | (2013.01) |

(52) U.S. Cl.
CPC ........... *B64D 45/00* (2013.01); *G06F 3/0482* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 7,949,335 B2 | 5/2011 | Stefani et al. | |
| 8,633,913 B1* | 1/2014 | Raghu | G08G 5/0021 340/945 |
| 8,768,534 B2 | 7/2014 | Lentz | |
| 2009/0045982 A1* | 2/2009 | Caillaud | G08G 5/065 340/972 |
| 2010/0131886 A1* | 5/2010 | Gannon | G06F 3/0485 715/786 |
| 2010/0161157 A1* | 6/2010 | Guilley | G05B 23/0272 701/3 |
| 2010/0250034 A1* | 9/2010 | Bouchard | G07C 5/0825 701/14 |
| 2012/0075123 A1* | 3/2012 | Keinrath | G01C 23/00 340/963 |
| 2015/0212701 A1* | 7/2015 | Rodney | G06F 3/04842 715/771 |

* cited by examiner

*Primary Examiner* — Brian Zimmerman
*Assistant Examiner* — Thomas McCormack

(57) ABSTRACT

A method of displaying a plurality of notifications issued on board an aircraft may include receiving the plurality of notifications from a plurality of applications operating on board the aircraft and displaying the plurality of notifications collectively on a single user interface. The single user interface may be configured to permit an aircraft crew member to select at least one notification from the plurality of notifications and display a description of the at least one notification selected by the aircraft crew member. The description may include at least one action to be performed by the aircraft crew member in response to the at least one notification.

12 Claims, 6 Drawing Sheets

NOTIFICATIONS

| EVENT NAME | RECEIVED (UTC) | READ |
|---|---|---|
| DIVERT FLIGHT: DIVERT CURRENT FLIGHT PATH... | 22 OCT 2013 19:32:49 | |
| DIVERT FLIGHT: DIVERT CURRENT FLIGHT PATH... | 16 OCT 2013 19:32:49 | |
| DIVERT FLIGHT: DIVERT CURRENT FLIGHT PATH... | 16 OCT 2013 19:32:42 | |
| DIVERT FLIGHT: DIVERT CURRENT FLIGHT PATH... | 16 OCT 2013 19:32:23 | |
| DIVERT FLIGHT: DIVERT CURRENT FLIGHT PATH... | 09 OCT 2013 16:04:03 | ✓ |
| DIVERT FLIGHT: DIVERT CURRENT FLIGHT PATH... | 09 OCT 2013 16:03:55 | ✓ |
| DIVERT FLIGHT: DIVERT CURRENT FLIGHT PATH... | 09 OCT 2013 16:02:22 | ✓ |

END ◁ PAGE 1 OF 1 ▷

*FIG. 3*

SYSTEMS AND METHODS FOR DISPLAYING NOTIFICATIONS ISSUED ON BOARD AIRCRAFTS

BACKGROUND

Currently, multiple applications run on board aircrafts and each application may issue one or more notifications. Each notification issued may be managed separately. This may increase the workload of the aircraft crew members. Also, there may be a possibility that a notification may be overlooked by the aircraft crew member in the presence of a large number of notifications from different applications.

What is needed, then, are systems and methods for collectively displaying all notifications from all applications on board the aircraft on a single user interface.

SUMMARY

Example embodiments may be directed to a method of displaying a plurality of notifications issued on board an aircraft. The method may include receiving a plurality of notifications from a plurality of applications operating on board an aircraft and displaying the plurality of notifications collectively on a single user interface. The single user interface may be configured to permit an aircraft crew member to select at least one notification from the plurality of notifications, and display a description of the at least one notification selected by the aircraft crew member. The description may include at least one action to be performed by the aircraft crew member in response to the at least one notification.

Example embodiments may be directed to a system for displaying a plurality of notifications issued on board an aircraft. The system may include a notification service module configured to receive a plurality of notifications from a plurality of applications operating on board an aircraft and a notification display module configured to display the plurality of notifications collectively on a single user interface. The single user interface may be configured to permit an aircraft crew member to select at least one notification from the plurality of notifications, and display a description of the at least one notification selected by the aircraft crew member. The description may include at least one action to be performed by the aircraft crew member in response to the at least one notification.

Example embodiments may be directed to a computer-program product for displaying a plurality of notifications issued on board an aircraft. The computer-program product may include a non-transitory computer-readable storage medium having instructions stored thereon. The instructions may be executed by one or more processors of a computer and may include instructions for configuring a notification service module to receive a plurality of notifications from a plurality of applications operating on board an aircraft and instructions for configuring a notification display module to display the plurality of notifications collectively on a single user interface. The instructions may further include instructions for configuring the single user interface to permit an aircraft crew member to select at least one notification from the plurality of notifications and display a description of the at least one notification selected by the aircraft crew member. The description may include at least one action to be performed by the aircraft crew member in response to the at least one notification.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 3 illustrates a Notification User Interface (UI) displaying read and unread notifications, according to exemplary embodiments.

DETAILED DESCRIPTION OF EXEMPLARY EMBODIMENTS

Figure 1:
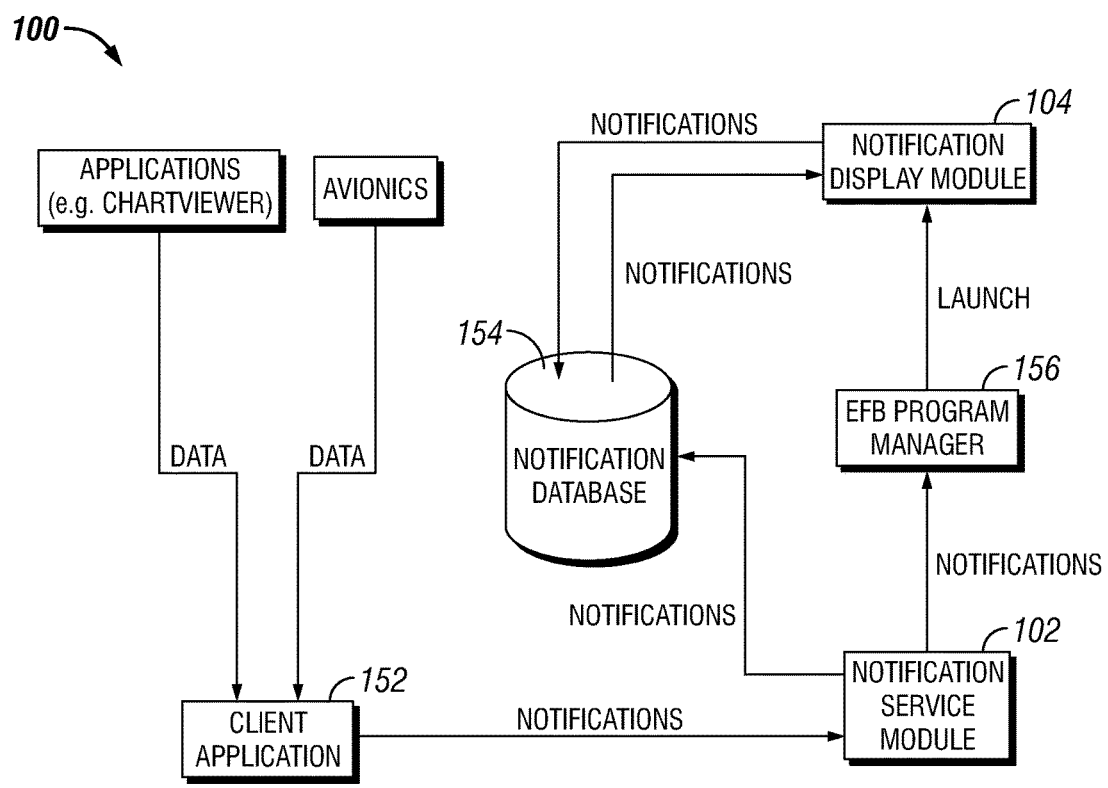
FIG. 1 illustrates an overview of a system on board an aircraft and including a Notification Service module and a Notification Display module, according to exemplary embodiments.

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

According to exemplary embodiments, various objects or components may be implemented as computing modules or program managers. The modules or program managers may be general-purpose, or they may have dedicated functions such as memory management, program flow, instruction processing, object storage, etc. The modules or program managers may be implemented in a hardware circuit including custom VLSI circuits or gate arrays, off-the-shelf semiconductors such as logic chips, transistors, or other discrete components, as are known in the art. One or more of the modules or program managers may also be implemented in programmable hardware devices such as field programmable gate arrays, programmable array logic, programmable logic devices or the like.

According to exemplary embodiments, one or more of the modules or program managers may be implemented in software for execution by various types of processors. An identified module or program manager of executable code may, for instance, include one or more physical or logical blocks of computer instructions that may, for instance, be organized as an object, procedure, or function. Further, the executables of an identified module (or program manager) may not be physically located together, but may include disparate instructions stored in different locations that, when joined logically together, include the module and achieve the stated purpose for the module. The executable code may be a single instruction, or many instructions, and may be distributed over several different code segments, among different programs, and across several memory devices. Similarly, operational data may be identified and illustrated in association with one or more modules or program managers, and may be embodied in any suitable form and organized within any suitable type of data structure. The operational data may be collected as a single data set, or may be distributed over different locations including over different storage devices, and may exist, at least partially, as electronic signals on a system or network.

According to exemplary embodiments, a database, as described herein, may be any standard or proprietary database software, such as ORACLE, MICROSOFT ACCESS, SYBASE, or DBASE II, for example. The database may have fields, records, data, and other database elements that may be associated through database specific software. Additionally, data may be mapped, or associating one data entry with another data entry. For example, the data contained in the location of a character file can be mapped to a field in a second table. The physical location of the database is not limiting, and the database may be remote or distributed. For example, the database may exist remotely from the server, and run on a separate platform. Further, the database may be accessible across a local area network (LAN), a wide area network (WAN), or the Internet. It is to be understood that more than one database may be implemented or used to create a single database.

FIG. 1 illustrates an overview of a system 100 on board an aircraft and including a Notification Service module 102 and a Notification Display module 104, according to exemplary embodiments. The Notification Service module 102 and the Notification Display module 104 may run/operate on one or more Electronic Flight Bags (EFBs) on board the aircraft. The Notification Display module 104 may receive a notification from the Notification Service module 102 and may display the received notification to an aircraft crew member. The Notification Service module 102 may receive one or more notifications issued by one or more client applications 152 (one shown) running on the aircraft. The one or more notifications may be issued based on data received by the client application 152 from other application(s) operating on the aircraft and/or aircraft avionics. The Notification Service module 102 may store the received notifications in one or more locations on board the aircraft, and forward the notifications to an EFB Program Manager 156 communicably coupled thereto. For instance, the notifications may be stored on one or more notification databases 154 (one shown) on board the aircraft. The EFB Program Manager 156 may indicate receipt of a notification on a Program Manager User Interface (See FIG. 2) that may be displayed on the EFB. The Program Manager User Interface, in response to a user input, may launch the Notification Display module 104. The Notification Display module 104 may display the one or more notifications collectively on a single user interface, for example the Notification User Interface (UI, See FIGS. 3 and 4). The Notification UI may be communicably coupled to the one or more Notification Databases 154 and may collectively display all read and unread notifications, as well as details about any particular notification.

A variety of notifications may be issued by one or more applications operating on the aircraft. For example, the notifications may be issued because of an action (e.g., yoke deflection and rudder pedal deflection, opening/closing of cabin door) by the aircraft crew members, aircraft position (e.g., GPS coordinates), atmospheric pressure and temperature, wind speed, aircraft ground speed, altitude, heading, bearing, and the like. A notification may include a notification message and an action to be performed in response to the notification. The notification message may include a description of the event that caused the notification to be issued. The action to be performed may indicate the activity that one or more aircraft crew members may undertake in response to the notification. For instance, a notification may be issued if the aircraft is approaching a restricted airspace. The notification message may include a description of why the notification was issued and the action may indicate diverting the flight path of the aircraft. It should be noted that the one or more applications disclosed herein refer to one or more enabled applications that operate on board an aircraft during various stages of aircraft operation. The applications may be installed on an Electronic Flight Bag (EFB) or may be installed on the aircraft itself.

Figure 2:
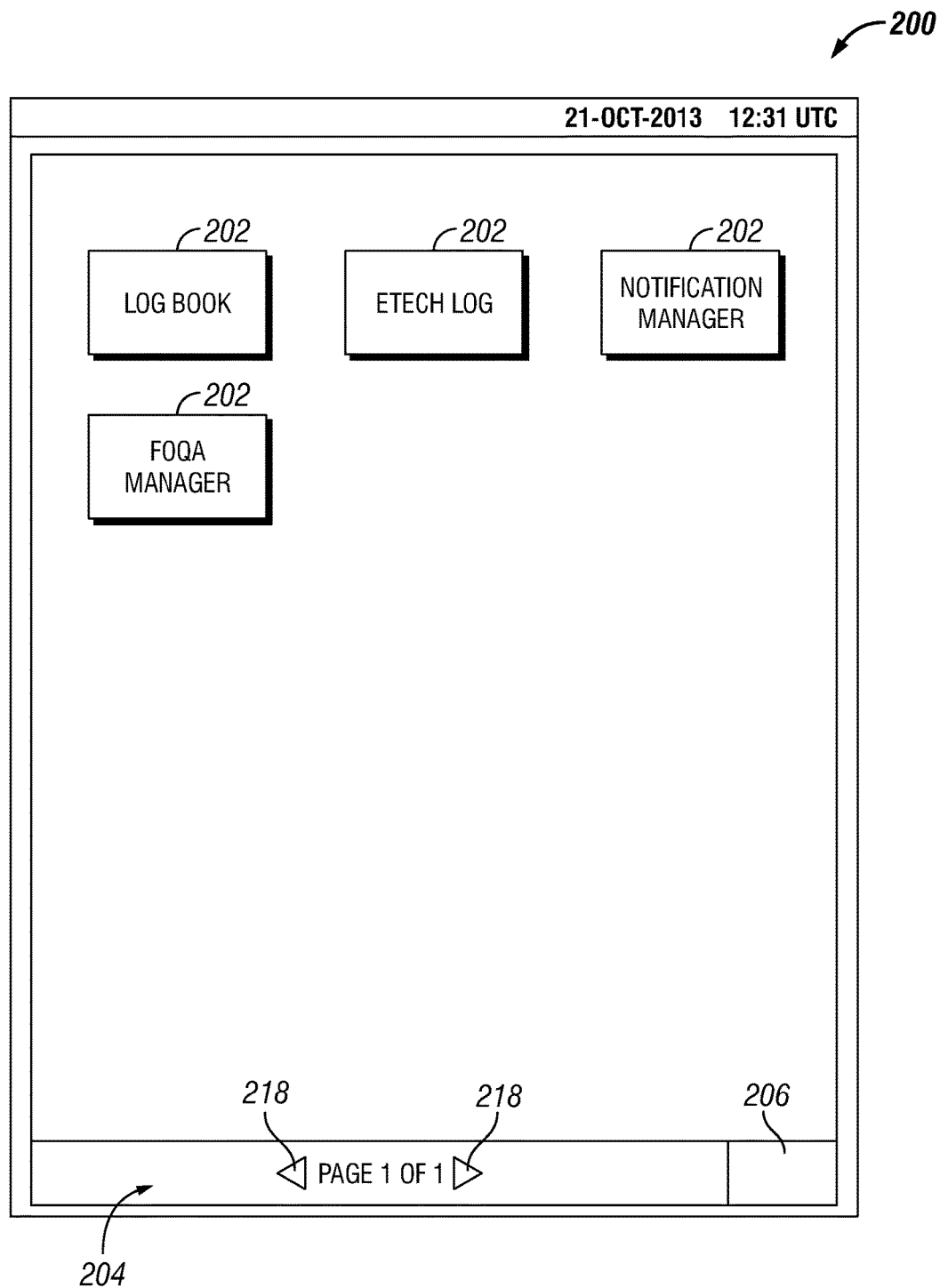
FIG. 2 illustrates a Program Manager User Interface (UI) displayed by the Electronic Flight Bag (EFB) Program Manager of FIG. 1 on the EFB, according to exemplary embodiments.

FIG. 2 illustrates a Program Manager User Interface (UI) 200 displayed by the EFB Program Manager 156 on the EFB, according to exemplary embodiments. The Program Manager UI 200 may be displayed after a user accessing the Notification Manager 100 has been authenticated. The Program Manager UI 200 may either occupy the entire display of the EFB or may occupy a portion thereof. The Program Manager UI 200 may display the one or more applications (four applications shown in FIG. 2) operating on the aircraft. The display screen of the EFB may be touch enabled and the user may be able to select a desired application by touching the display screen. The applications may be shown as icons 202 on the display with each icon 202 corresponding to an application. As illustrated in FIG. 2, four icons 202 corresponding to four applications, "LOGBOOK," "ETECH LOG," "NOTIFICATION MANAGER," and "FOQA MANAGER" may be displayed on the EFB. The applications may be displayed on multiple pages and the Program Manager UI 200 may display the current page and the total number of pages in an area 204 of the Program Manager UI 200. The user may view the multiple pages using the arrow icons 218.

The Program Manager UI 200 may also display a context icon 206. The context icon 206 may be configured for a different purpose for each application. For instance, in the case of Notification Manager, the context icon 206 may be configured to display only unread notifications. In an exemplary embodiment, the context icon 206 may also alert a user of receipt of a high priority notification. This may be indicated by the context icon 206 changing color from green to amber. As described below, when the user selects the amber colored context icon 206, all unread notifications including the high priority notification that caused the alert may be displayed and the context icon 206 may revert back to green.

FIG. 3 illustrates a Notification User Interface (UI) 300 displaying read and unread notifications, according to exemplary embodiments. When a user selects the Notification Manager icon 202 from the Program Manager UI 200 displayed on the EFB, the Notification UI 300 may be displayed. As illustrated in FIG. 3, the Notification UI 300 may collectively display all received read and unread notifications. The received notifications may be displayed in the form of a table and may include high and low priority notifications. In an exemplary embodiment, an outline of a row including a high priority notification may be amber. A column 302 may display the names of all received notifications (read and unread), column 304 may indicate the time and date at which each notification was received, and column 306 may indicate whether a notification has been read. The topmost row of the table may display the most recently received notification. As illustrated in FIG. 3, the most recent notification was received on Oct. 22, 2013, at 19:32:49 UTC and is displayed in the topmost row. When a notification has been read, a check mark may appear adjacent the notification in column 306. The Notification UI 300 may also display the notifications on multiple pages. The Notification UI 300 may indicate the number of pages and the current page being viewed in an area 308 of the Notification UI 300. The user may view the multiple pages using the arrow icons 318.

A user may be able to sort the notifications displayed on the Notification UI 300 by selecting (e.g., touching) the respective column headers 310, 312, 314. For instance, when the user selects the "Event Name" column header 310, the notifications may be sorted in descending alphabetical order from the top. When the user again selects the "Event Name" column header 310, the notifications may be sorted in an ascending alphabetical order from the top. When the user selects the "Received (UTC)" column header 312, the notifications may be sorted chronologically with the most recently received notification appearing at the top. When the user again selects the "Received (UTC)" column header 312, the notifications may be sorted chronologically with the most recently received notification appearing at the bottom. When the user selects the "Read" column header 314, the notifications may be sorted with the unread notifications at the top followed by the read notifications. When the user selects the "Read" column header 314 again, the notifications may be sorted with the read notifications at the top followed by the unread notifications.

The Notification UI 300 may also display an "END" icon 316 adjacent the area 308. The user may exit the Notification UI 300 by selecting the "END" icon 316 to return to the Program Manager UI 200. It should be noted that the placement of the icons 202, 206, 316, 318, the columns 302, 304, 306, areas 204, 308 is merely an example and that the Notification UI 300 may be user-configurable.

Figure 4:
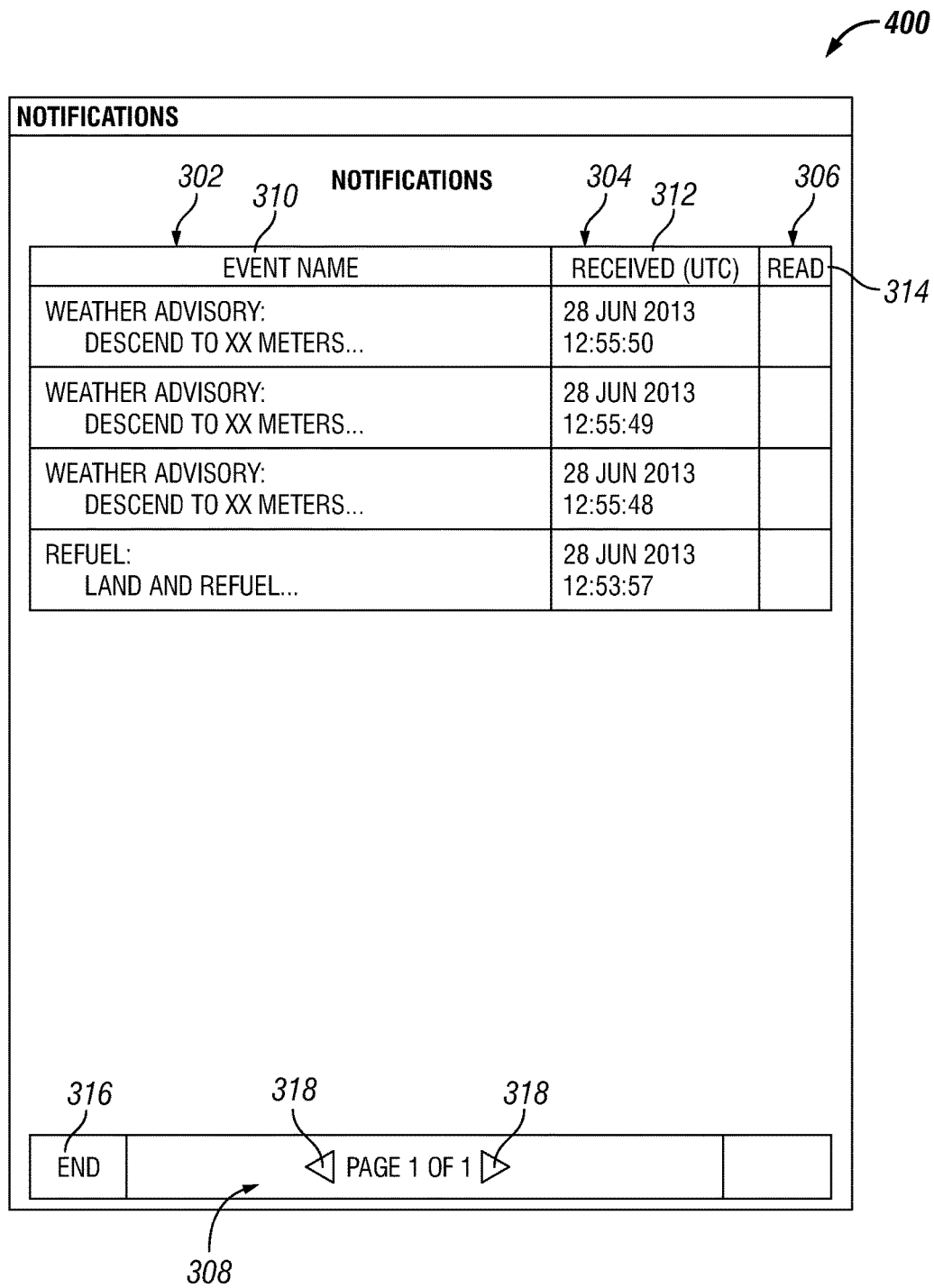
FIG. 4 illustrates a Notification User Interface (UI) displaying only unread notifications, according to exemplary embodiments.

FIG. 4 illustrates a Notification User Interface (UI) 400 displaying only unread notifications, according to exemplary embodiments. The Notification UI 400 may be similar in some respects to the Notification UI 300 illustrated in FIG. 3, and, therefore, may be best understood with reference to the description of FIG. 3, where like numerals designate like components and will not be described again in detail. As mentioned above, the context icon 206 (FIG. 2) may be configured to alert a user of receipt of a high priority notification. When a user selects (e.g., by touching) the context icon 206 in the Program Manager UI 200 (FIG. 2), the Notification UI 400 may be displayed. The Notification UI 400 may display only unread notifications in the form of a table with the most recently received notification appearing as the topmost row of the table. The table may include high priority and low priority notifications. In an exemplary embodiment, an outline of a row including a high priority notification may be amber.

Figure 5:
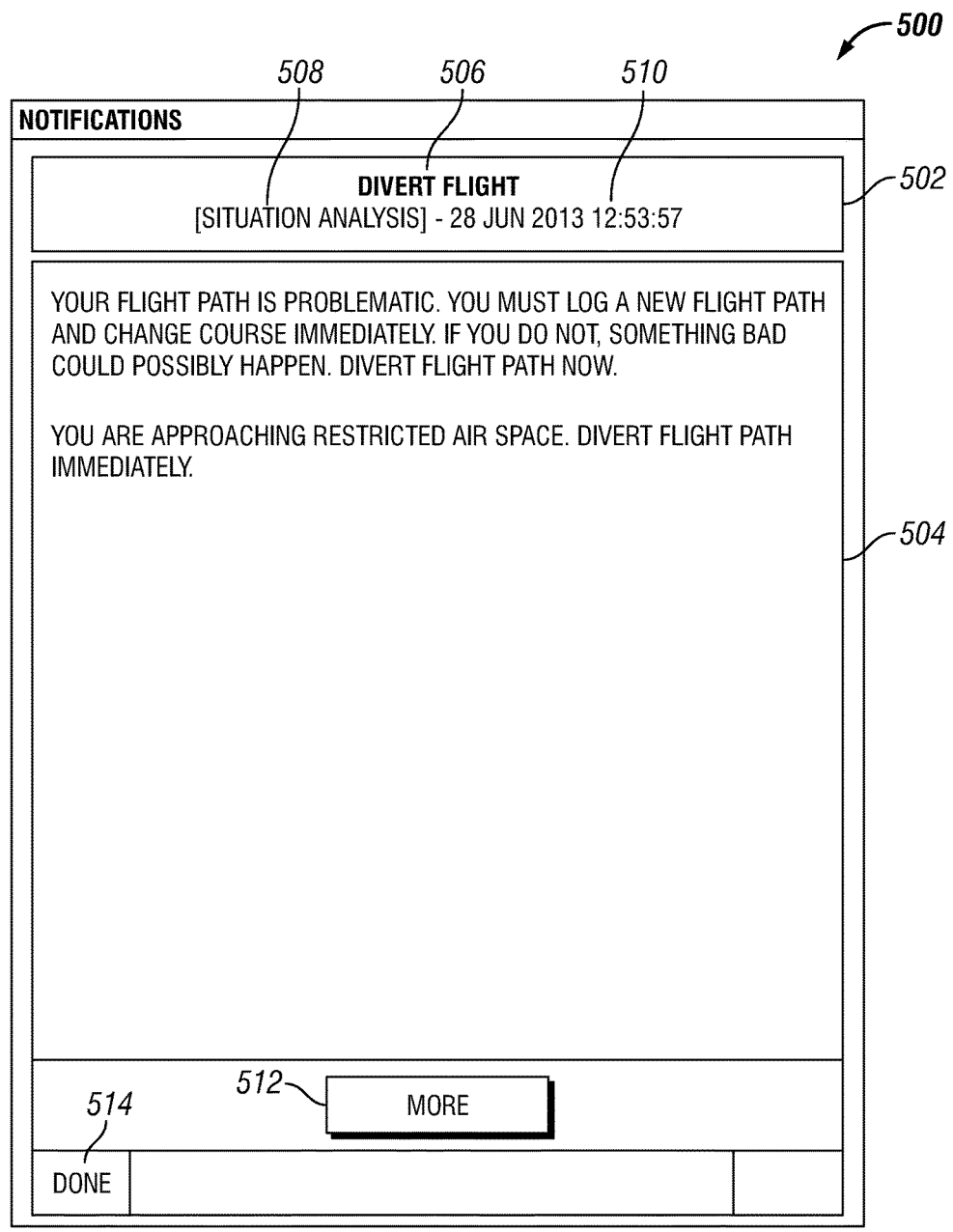
FIG. 5 illustrates the Detailed Description User Interface (UI) for displaying a detailed description of a notification selected by a user, according to exemplary embodiments.

FIG. 5 illustrates the Detailed Description User Interface (UI) 500 for displaying a detailed description of a notification selected by a user, according to exemplary embodiments. In order to view a Detailed Description UI 500 of a desired notification, the user (e.g., aircraft crew member) may touch the row including the desired notification in the Notification UIs 300 or 400. The Detailed Description UI 500 may include two boxes, a top box 502 and a bottom box 504, each having an outline depending on the priority of the notification selected. For example, if a low priority notification is selected, the outline of both boxes 502, 504 may be green. If a high priority notification is selected, the outline of both boxes 502, 504 may be amber. It will be understood that the color of the box outline is a user configurable parameter. The top box 502 may be displayed at or near the top edge of the EFB and the bottom box 504 may be displayed at or near the bottom edge of the EFB. The top box 502 may display the notification name 506, name 508 of the application that resulted in the notification, and the timestamp 510 including the date and time the notification was received. The bottom box 504 may display the action to be performed by the user in response to the notification and a detailed description of the notification.

The Detailed Description UI 500 may also display a "More" icon 512. The user may select the "More" icon 512 to obtain additional information about the notification. For instance, the additional information may include details on how to perform the action. Alternatively, selecting the "More" icon 512 may result in the notification being transmitted to ground control for further processing. A "Done" icon 514 may be displayed on the Detailed Description UI 500. The user may return to the corresponding Notification UIs 300, 400 by selecting the "Done" icon 514. The notification of which the detailed description was viewed may no longer be displayed on the respective Notification UIs 300, 400. It should be noted that the placement of the icons 512, 514, and boxes 502, 504 is merely an example and that the Detailed Description UI 500 may be user-configurable.

Figure 6:
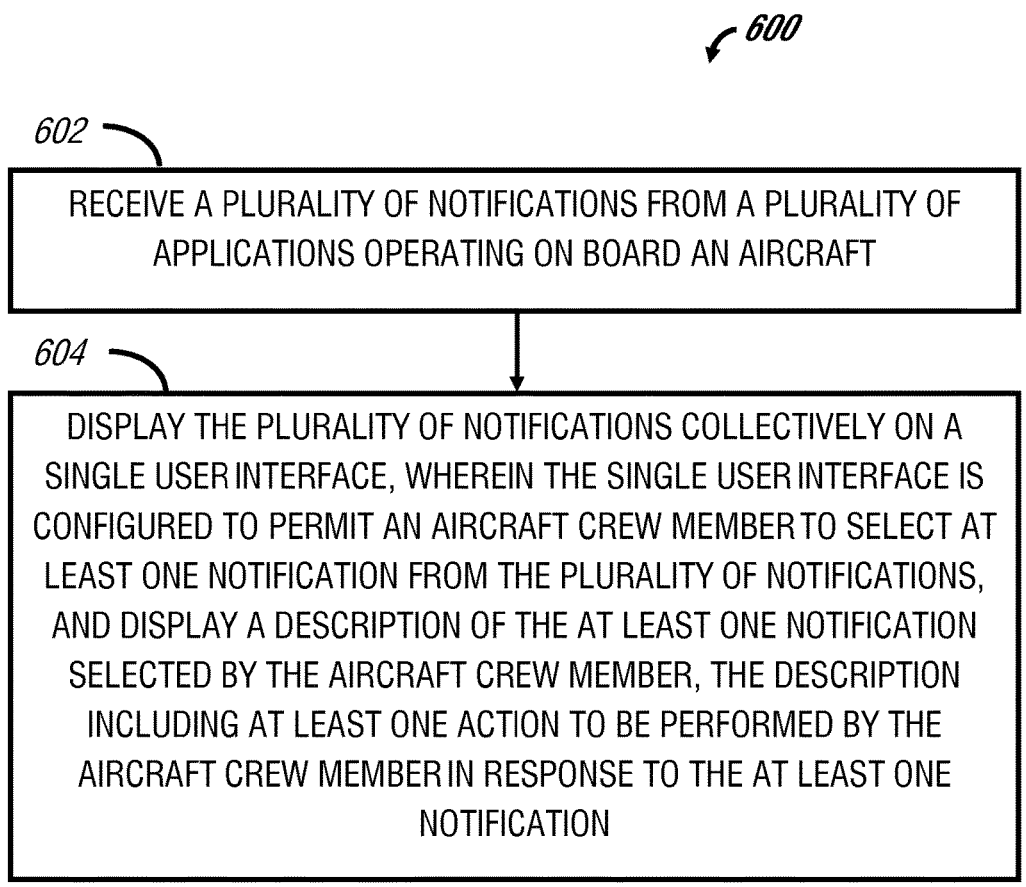
FIG. 6 illustrates a flowchart for a method of displaying a plurality of notifications issued on board an aircraft, according to exemplary embodiments.

FIG. 6 illustrates a flowchart of a method 600 of displaying a plurality of notifications issued on board an aircraft, according to exemplary embodiments. The method 600 may include receiving the plurality of notifications from a plurality of applications operating on board the aircraft, as at 602, and displaying the plurality of notifications collectively on a single user interface, as at 604. The single user interface may be configured to permit an aircraft crew member to select at least one notification from the plurality of notifications and display a description of the at least one notification selected by the aircraft crew member. The description may include at least one action to be performed by the aircraft crew member in response to the at least one notification.

Example embodiments may also be directed to a computer-program product for displaying at least one notification issued on board an aircraft. The computer-program product may include one or more instructions stored on a non-transitory computer-readable storage medium and executable by one or more processors. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray (Registered Trademark) disc where disks usually reproduce data magnetically, while discs reproduce data optically with lasers.

Software or instructions may also be transmitted over a transmission medium. For example, when the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A method of displaying a plurality of notifications issued on board an aircraft, the method comprising:
   receiving a plurality of notifications on an electronic flight bag on board the aircraft from a plurality of applications operating on board the aircraft;
   assigning a high priority or a low priority to each of the notifications;
   converting a color of an icon displayed on a first user interface of the electronic flight bag from a first color to a second color in response to at least one notification being assigned a high priority; and
   displaying, in response to a selection of the icon converted to the second color, only unread notifications of the plurality of notifications collectively on a second user interface of the electronic flight bag, wherein displaying the unread notifications occurs only after the selection of the icon converted to the second color, the unread notifications include the at least one notification being assigned a high priority, and the second user interface is configured to
   permit an aircraft crew member to select at least one notification from the unread notifications, and
   display a description of the at least one notification selected by the aircraft crew member, the description including at least one action to be performed by the aircraft crew member in response to the at least one notification selected by the aircraft crew member,
   wherein only the second user interface is displayed on the electronic flight bag after the selection of the icon converted to the second color.

2. The method of claim 1, further comprising:
   removing the at least one notification selected by the aircraft crew member from the unread notifications after the description of the at least one notification selected by the aircraft crew member has been displayed.

3. The method of claim 1, wherein the description of the at least one notification selected by the aircraft crew member further includes a reason for the issuance of the at least one notification selected by the aircraft crew member.

4. The method of claim 1, wherein the unread notifications are chronologically displayed.

5. The method of claim 1, wherein the unread notifications are alphabetically displayed.

6. A system for displaying a plurality of notifications issued on board an aircraft, comprising:
   a notification service module operating on an electronic flight bag on board the aircraft and configured to receive a plurality of notifications from a plurality of applications operating on board an aircraft and assign a high priority or a low priority to each of the notifications; and
   a notification display module operating on the electronic flight bag and configured to
   convert a color of an icon displayed on a first user interface of the electronic flight bag from a first color to a second color in response to at least one notification being assigned a high priority, and
   display, in response to a selection of the icon converted to the second color, only unread notifications of the plurality of notifications collectively on a second user interface of the electronic flight bag, wherein displaying the unread notifications occurs only after the selection of the icon converted to the second color, the unread notifications include the at least one notification being assigned a high priority, and the second user interface is configured to
   permit an aircraft crew member to select at least one notification from the unread notifications, and
   display a description of the at least one notification selected by the aircraft crew member, the description including at least one action to be performed by the aircraft crew member in response to the at least one notification selected by the aircraft crew member,
   wherein only the second user interface is displayed on the electronic flight bag after the selection of the icon converted to the second color.

7. The system of claim 6, wherein the notification display module is further configured to remove the at least one notification selected by the aircraft crew member from the unread notifications after the description of the at least one notification selected by the aircraft crew member has been displayed.

8. The system of claim 6, wherein the description of the at least one notification selected by the aircraft crew member further includes a reason for the issuance of the at least one notification selected by the aircraft crew member.

9. The system of claim 6, wherein the notification display module is further configured to display the unread notifications chronologically.

10. The system of claim 6, wherein the notification display module is further configured to display the unread notifications alphabetically.

11. A computer-program product for displaying a plurality of notifications issued on board an aircraft, the computer-program product embodied in a non-transitory computer-readable storage medium having instructions stored thereon, the instructions being executable by one or more processors, and the instructions comprising:

instructions for configuring a notification service module operating on an electronic flight bag on board the aircraft to receive a plurality of notifications from a plurality of applications operating on board an aircraft and assign a high priority or a low priority to each of the notifications;

instructions for configuring a notification display module operating on the electronic flight bag to convert a color of an icon displayed on a first user interface of the electronic flight bag from a first color to a second color in response to at least one notification being assigned a high priority, and display, in response to a selection of the icon converted to the second color, only unread notifications of the plurality of notifications collectively on a second user interface of the electronic flight bag, wherein displaying the unread notifications occurs only after the selection of the icon converted to the second color, and the unread notifications include the at least one notification being assigned a high priority; and instructions for configuring the single user interface to permit an aircraft crew member to select at least one notification from the unread notifications, and display a description of the at least one notification selected by the aircraft crew member, the description including at least one action to be performed by the aircraft crew member in response to the at least one notification selected by the aircraft crew member, wherein only the second user interface is displayed on the electronic flight bag after the selection of the icon converted to the second color.

12. The computer-program product of claim 11, wherein the instructions further comprise:

instructions for configuring the notification display module to display a reason for the issuance of the at least one notification selected by the aircraft crew member in the description of the at least one notification selected by the aircraft crew member.

* * * * *